US012675546B2

(12) United States Patent
Raina et al.

(10) Patent No.: US 12,675,546 B2
(45) Date of Patent: Jul. 7, 2026

(54) CALIBRATION METRICS FOR MEASURING TRAJECTORY PREDICTION

(71) Applicant: GM CRUISE HOLDINGS LLC, San Francisco, CA (US)

(72) Inventors: Siddharth Raina, San Francisco, CA (US); Frank Jiang, San Francisco, CA (US); Mircea Grecu, San Mateo, CA (US); Stephanie Lefevre, Los Altos, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 1146 days.

(21) Appl. No.: 17/556,684

(22) Filed: Dec. 20, 2021

(65) Prior Publication Data

US 2023/0195830 A1     Jun. 22, 2023

(51) Int. Cl.
 *G06F 17/10* (2006.01)
 *G06F 18/214* (2023.01)

(52) U.S. Cl.
 CPC ............ *G06F 17/10* (2013.01); *G06F 18/214* (2023.01)

(58) Field of Classification Search
 CPC ............................... G06F 17/10; G06F 18/214
 See application file for complete search history.

(56) References Cited

U.S. PATENT DOCUMENTS

| | | | |
|---|---|---|---|
| 11,810,365 B1 * | 11/2023 | Crego | G06V 20/58 |
| 12,165,017 B1 * | 12/2024 | Grossman | G06F 17/17 |
| 2014/0114189 A1 * | 4/2014 | Kanayama | G01S 7/52036 |
| | | | 600/443 |
| 2018/0124423 A1 * | 5/2018 | Choi | G06V 10/82 |
| 2022/0035376 A1 * | 2/2022 | Laddah | G05D 1/247 |
| 2022/0058922 A1 * | 2/2022 | Bai | G06N 20/10 |
| 2022/0194424 A1 * | 6/2022 | Li | B60W 30/0956 |
| 2023/0074293 A1 * | 3/2023 | Ivanovic | B60W 40/04 |
| 2023/0192077 A1 * | 6/2023 | Tairbekov | B60W 30/0956 |
| | | | 701/301 |

(Continued)

OTHER PUBLICATIONS

Mahler R, Divergence detectors for multitarget tracking algorithms, Proc. of SPIE vol. 8745, 87450F (Year: 2013).*

(Continued)

*Primary Examiner* — Ryan F Pitaro
*Assistant Examiner* — Adrian Stoica
(74) *Attorney, Agent, or Firm* — Honigman LLP; Matthew H. Szalach; Jonathan P. O'Brien

(57) ABSTRACT

The present technology pertains to measuring the quality of an uncertainty prediction provided by a trajectory prediction algorithm. An AI/ML platform can receive data including predicted trajectories of objects received from the trajectory prediction algorithm and observed paths for the objects received from the plurality of sensors. The predicted trajectories indicate predicted locations of the objects at a plurality of time intervals, and uncertainty predictions reflecting an uncertainty about the location of the objects at each of the predicted time intervals. The AI/ML platform can further determine respective standard deviations of the observed paths of the objects relative to the respective uncertainty predictions and plots the respective standard deviations against an ideal distribution of path distributions relative to the predicted locations of the objects at the plurality of time intervals.

17 Claims, 10 Drawing Sheets

(56) References Cited

U.S. PATENT DOCUMENTS

2024/0321111 A1 * 9/2024 Guo ........................ G08G 3/02

OTHER PUBLICATIONS

Math Stack Exchange, math.stackexchange.com, Apr. 2021 (Year: 2021).*
Zhao Where Are You Heading? Dynamic Trajectory Prediction With Expert Goal Examples, ICCV Oct. 2021 (Year: 2021).*
Zhao Where Are You Heading? Page showing the ICCV date in Oct. 2021 (Year: 2021).*

* cited by examiner

501

502

700

800

START receive data                                                    ~805 determine respective standard deviations                        ~810 plot the respective standard deviations                         ~815 determine that the uncertainty predictions                      ~820 adjust the trajectory prediction                                ~825

END

CALIBRATION METRICS FOR MEASURING TRAJECTORY PREDICTION

TECHNICAL FIELD

The subject technology pertains to providing a range of error for a trajectory prediction, and more specially pertains to calibrating the provided range of error for the trajectory predictions.

BACKGROUND

An autonomous vehicle is a motorized vehicle that can navigate without a human driver. An exemplary autonomous vehicle includes a plurality of sensor systems, such as, but not limited to, a camera sensor system, a lidar sensor system, a radar sensor system, amongst others, wherein the autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system.

The internal computing system of the autonomous vehicle can include a prediction stack that can predict trajectories of objects and can also provide an uncertainty distribution for where the object might be at a given point in time.

SUMMARY

Disclosed are systems, apparatuses, methods, computer readable medium, and circuits for measuring the quality of an uncertainty prediction provided by a trajectory prediction algorithm. According to at least one example, a method includes receiving data received from vehicles having a plurality of sensors and executing the trajectory prediction algorithm. The data comprises predicted trajectories of objects received from the trajectory prediction algorithm and observed paths for the objects received from the plurality of sensors. The predicted trajectories indicate predicted locations of the objects at a plurality of time intervals, and uncertainty predictions reflecting an uncertainty about the location of the objects at each of the predicted time intervals. The method further determines respective standard deviations of the observed paths of the objects relative to the respective uncertainty predictions and plots the respective standard deviations against an ideal distribution of path distributions relative to the predicted locations of the objects at the plurality of time intervals. The method determines whether the uncertainty predictions provided by the trajectory prediction algorithm are underfitted or overfitted and adjusts the trajectory prediction algorithm to provide uncertainty predictions that better correlate to the ideal distribution of path distributions.

DETAILED DESCRIPTION

Autonomous Vehicles (AVs) can navigate roadways without a human driver by using sensor signals generated by multiple sensor systems positioned around the AV and utilizing algorithms to interpret the sensor data and navigate the AV. One important function of the algorithms are to identify and predict the movement of objects observed in proximity to the AV. The data obtained by the sensors positioned around the AV may be input into a trajectory prediction algorithm that predicts where the objects in the scene will be in the future. This prediction assists in guiding the movement of the AV, so that the AV can avoid a collision with such an object, for example.

It is important for the trajectory prediction algorithm to provide an indication of uncertainty that indicates a probable deviation from the predicted path of the object. This allows algorithms that consume the predicted paths to understand that if the object follows the predicted path, that the object deviate somewhat from the predicted path, and this deviation can be expressed in terms of a probabilistic distribution.

It is important to know if this uncertainty (that is indicated as a probabilistic distribution) provided by the trajectory prediction algorithm is reasonably correct such that consumers of this information can rely on the information. A deviation between a predicted path and an actual path may be measured using the $L^2$-Norm, which measures the Euclidean distance between where the object was predicted to be after a specified time, and the actual location of the object at that specified time. However, currently there is no clear way of measuring whether the uncertainty distribution that the model provides is a good distribution that accurately describes a probability that the object will deviate from the predicted location of the object (i.e. the standard deviation of the distribution of where the object may actually be located relative to the uncertainty distribution). That is, there is no clear way to know if the trajectory prediction algorithm overestimates or underestimates the uncertainty of the algorithm. The approach described therein addresses this problem of determining whether the trajectory prediction model overestimates or underestimates uncertainty.

Figure 1:
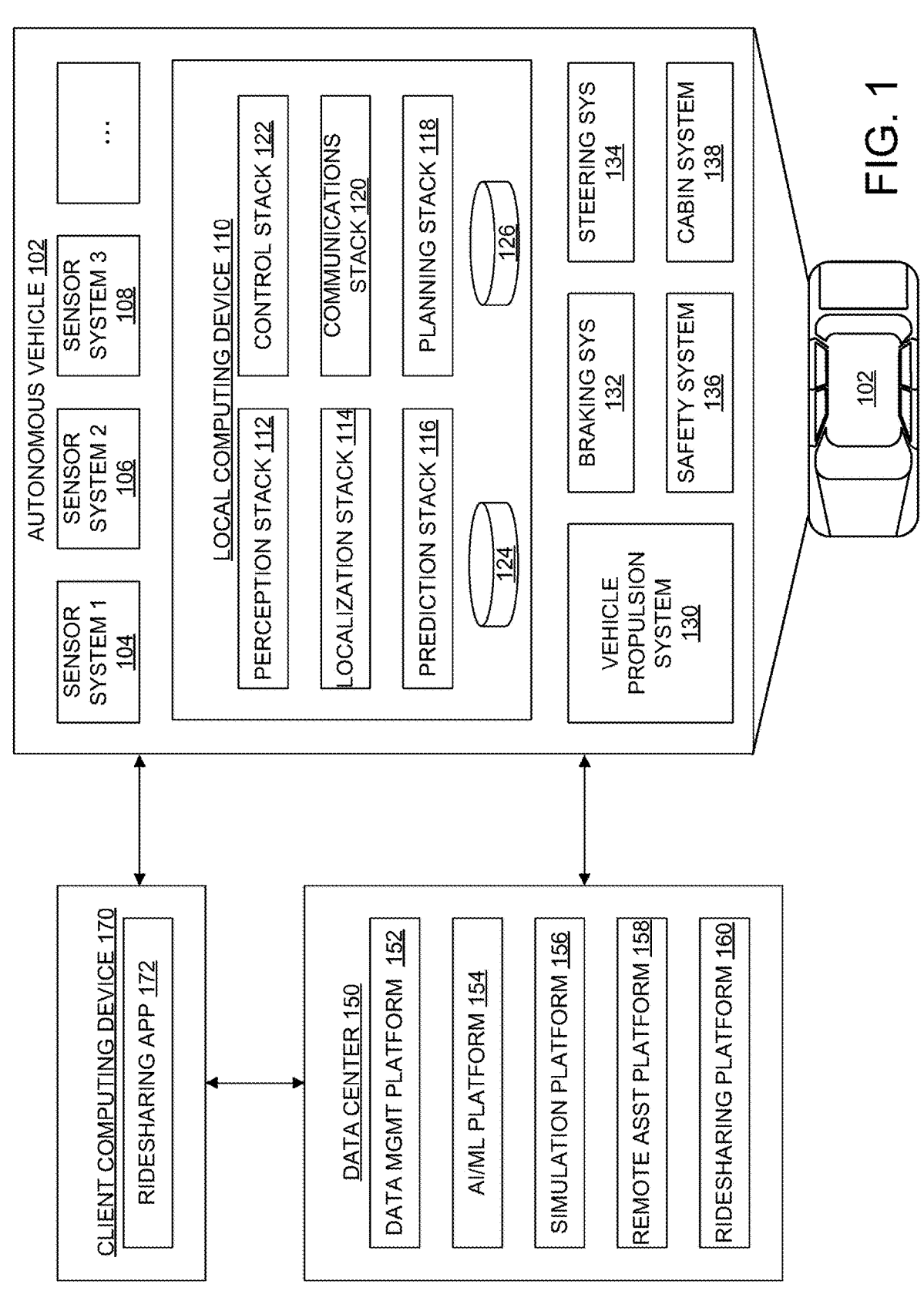
FIG. 1 illustrates an example of a system for managing one or more Autonomous Vehicles (AVs) in accordance with some aspects of the present technology.

FIG. 1 illustrates an example of an AV management system 100. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measurement Units (IMUs), cameras (e.g., still image cameras, video cameras, etc.), light sensors (e.g., light detection and ranging (LIDAR) systems, ambient light sensors, infrared sensors, etc.), RADAR systems, global positioning system (GPS) receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other embodiments may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some embodiments, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth. In some embodiments, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some embodiments, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some embodiments, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communication stack 120 can transmit and receive signals between the various stacks and other components of the AV 102 and between the AV 102, the data center 150, the client computing device 170, and other remote systems. The communication stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some embodiments, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can be a private cloud (e.g., an enterprise network, a co-location provider network, etc.), a public cloud (e.g., an IaaS network, a PaaS network, a SaaS network, or other CSP network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the cartography platform, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the cartography platform, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from the cartography platform; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general purpose computing device for accessing the ridesharing application 172. The client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Figure 2:
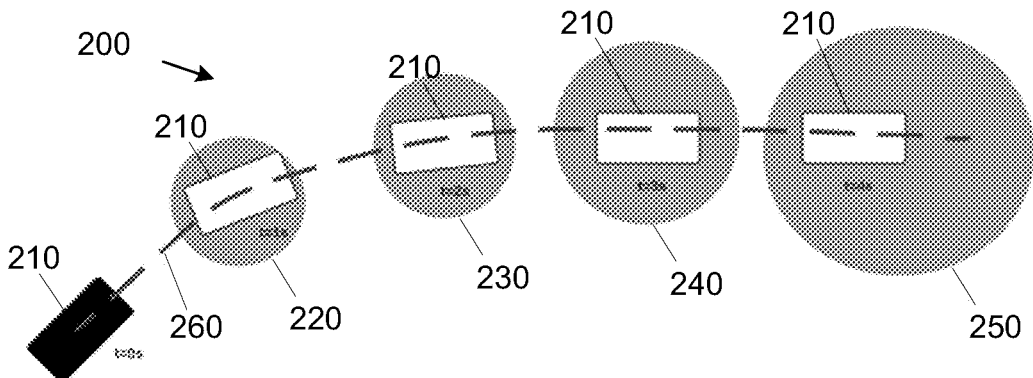
FIG. 2 illustrates a visualization of the output of a trajectory prediction model in accordance with some aspects of the present technology.

FIG. 2 illustrates a visualization 200 of the output of a trajectory prediction model in accordance with some aspects of the present technology. An AV (not shown in FIG. 2) is equipped with multiple sensor systems as well as a trajectory prediction algorithm (that is part of the prediction stack 116 in FIG. 1) that utilizes the data obtained by the sensors (104, 106, 108, . . . ) to predict the future locations of objects proximate to the AV. The sensors provide the necessary data to the trajectory prediction algorithm to determine the predicted future location of the object 210 as well as an uncertainty prediction. This uncertainty prediction is the distribution of probabilities that the trajectory prediction algorithm uses to characterize where the object 210 will be located if the object takes the predicted path 260.

For example, FIG. 2 shows object 210 that the sensor system of the AV has detected as well as the predicted path 260 of object 210 and the uncertainty predictions 220, 230, 240, and 250 associated with the predicated path 260 that have been determined by the trajectory prediction model. At the time the sensors identify object 210 (i.e. t=0 s), the location of the object 210 is known and there is no uncertainty value. The output of the trajectory prediction model 200 further shows where the model predicts that object 210 will be located after 1 second (i.e. t=1 s) as well as the uncertainty prediction 220 associated with that prediction. Likewise, the output of the trajectory prediction model 200 shows the predicted location of object 210 after 2 seconds (i.e. t=2 s) and the associated uncertainty prediction 230, the predicted location of object 210 after 3 seconds (i.e. t=3 s) and the associated uncertainty prediction 240, and the predicted location of object 210 after 4 second (i.e. t=4 s) and the associated uncertainty prediction 250. Each of these uncertainty predictions is a probabilistic distribution that the object will be somewhere within the area covered by the uncertainty prediction.

As shown in FIG. 2, as the time increases, the range that the uncertainty predictions 220, 230, 240, and 250 cover increases because the path is less certain further into the future. The predicated location of object 210 at future times is a distribution rather than an absolute value. One way to measure the error of a model in predicting the location of the object 210 is the L^2-Norm which measures the Euclidean distance between where the object 210 was predicted at a specified time and the actual location of the object at that time. Additionally, it is important to measure the accuracy of the distribution represented in the uncertainty prediction. For example, as shown in FIG. 2, as the time increases, the uncertainty prediction 220, 230, 240, and 250 also increase. At four seconds (i.e. t=4 s), the uncertainty prediction 250 is larger than the uncertainty predictions 220, 230, and 240 calculated at earlier times. It is important to know whether the trajectory prediction model overestimates or underestimates the size and distribution of the uncertainty prediction.

Figure 3:
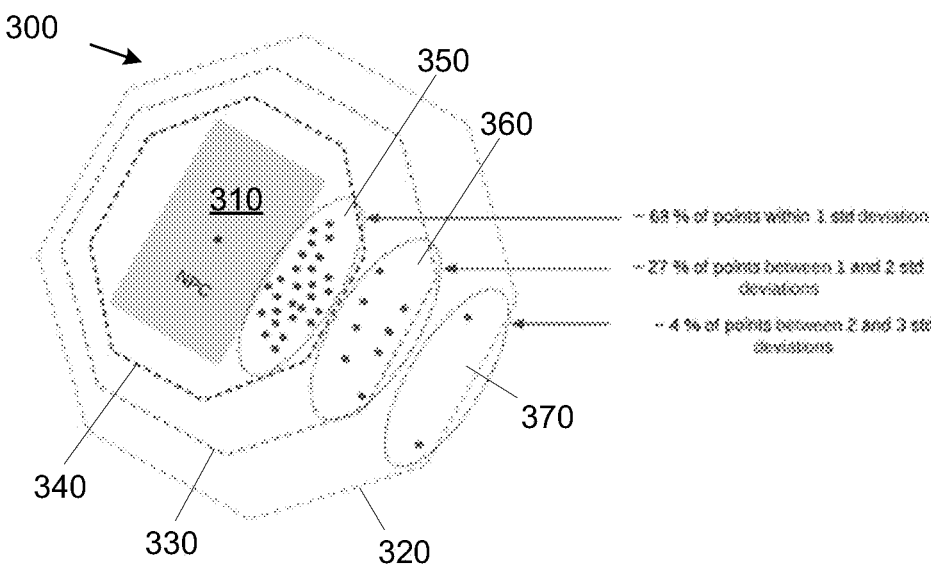
FIG. 3 illustrates a visualization of sensed point cloud data in accordance with some aspects of the present technology.

FIG. 3 illustrates a visualization 300 of sensed point cloud data in accordance with some aspects of the present technology. In order to determine whether the trajectory prediction model overestimates or underestimates the uncertainty values, a calibrated trajectory prediction model is defined. The calibrated trajectory prediction model requires that the actual location of the object should lie (1) within 1 standard deviation 340 of the predicted uncertainty bubble 68% of the time, (2) between 1 standard deviation 340 and 2 standard deviations 330 of the predicted uncertainty bubble for 27% of the time, and (3) between 2 standard deviations 330 and 3 standard deviations 320 of the predicted uncertainty bubble for 4% of the time. For example, as shown in FIG. 3, object 310 has been sensed by the sensor system positioned around the AV. Point clouds 350 represent 68% of the points, point clouds 360 represent 27% of the points, and point clouds 370 represent 4% of the points.

These percentages are based on the assumption that the actual location of the object can be characterized from a

US 12,675,546 B2

9

Figure 4:
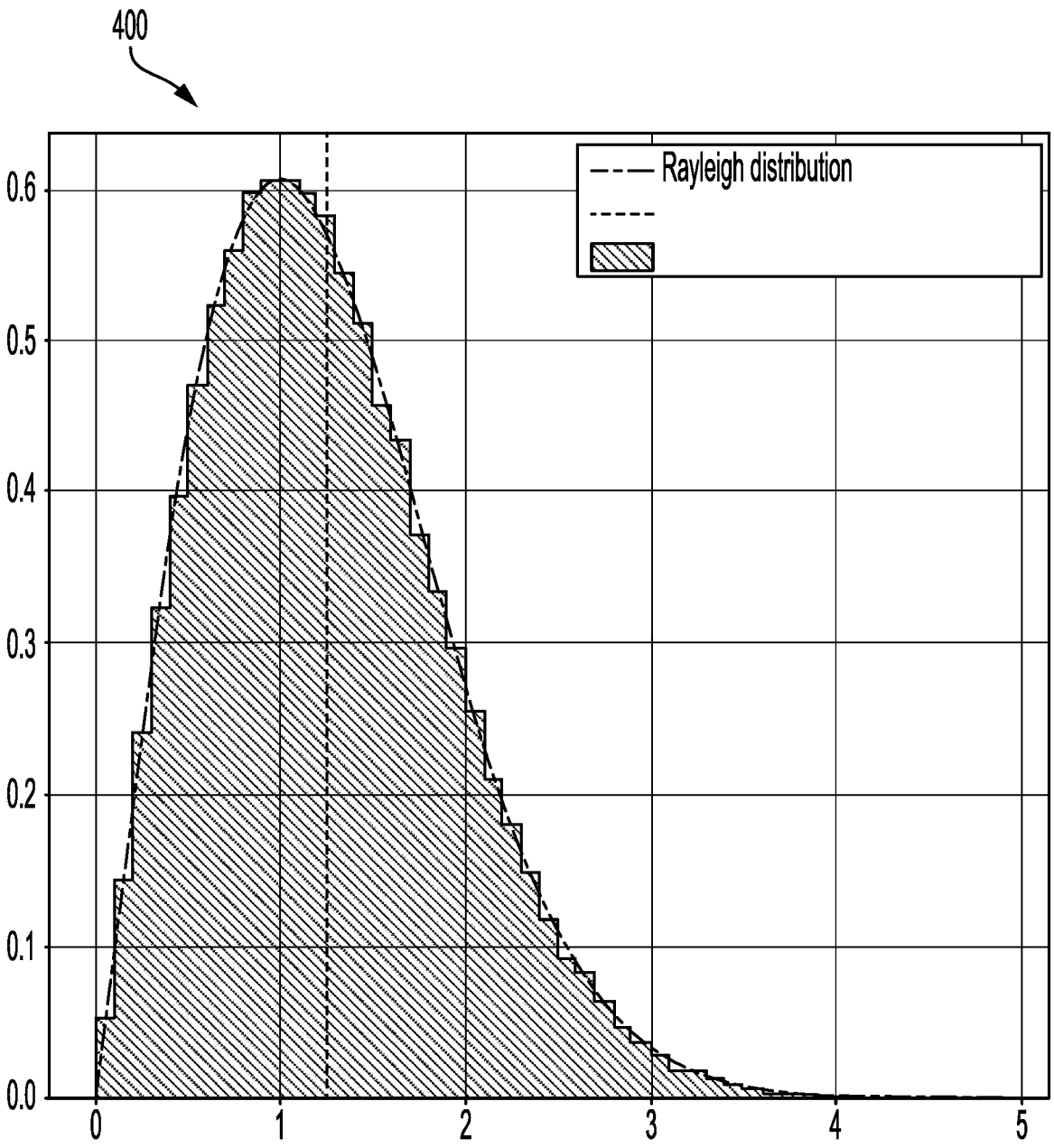
FIG. 4 illustrates a Rayleigh Distribution in accordance with some aspects of the present technology.

Distribution (normal distribution, Gaussian distribution, etc.) around the predicted location with a standard deviation equal to the predicted uncertainty. Next, a Mahalanobis distance is computed between the actual location of the object and the prediction (which is a Distribution around the predicted location with a standard deviation equal to the predicted uncertainty). This Mahalanobis distance is computed across multiple object predictions and the distribution of the Mahalanobis distances is visualized. For a calibrated trajectory prediction, the distribution of the Mahalanobis distances is a chi distribution with 2 degrees of freedom.

$$Y = \sqrt{\sum_{i=1}^{2} Z_i^2}$$

Where Z is a Gaussian distribution with mean=0 and sigma=1. This distribution is also known as a Rayleigh Distribution with sigma=1. FIG. 4 illustrates a Rayleigh Distribution 400 with sigma=1. However, in reality the trajectory prediction algorithm might overestimate or underestimates the size of the uncertainty values and is either over-calibrated or under-calibrated. This may be especially true for particular objects in particular situations. For example, the trajectory prediction algorithm may be well calibrated in situations in which an object is likely to follow a lane without any neighboring vehicles, but might be less well calibrated to predict a trajectory for a large vehicle in a narrow lane with traffic on one side.

Figure 5A:
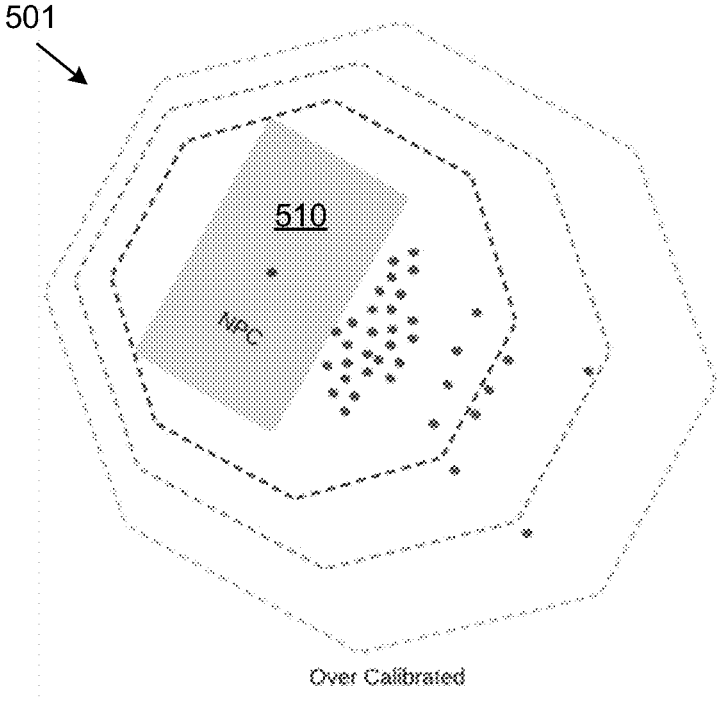
FIG. 5A illustrates a visualizations of sensed point cloud data in accordance with some aspects of the present technology.
Figure 5B:
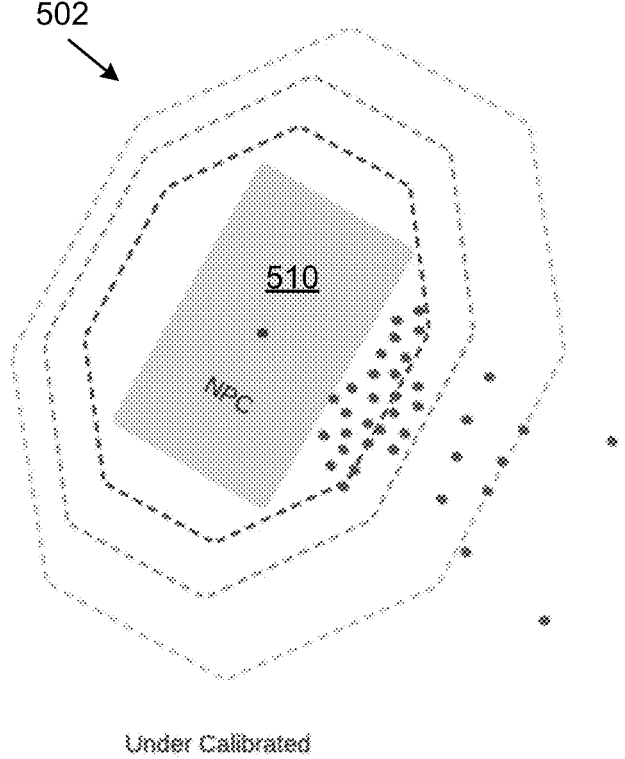
FIG. 5B illustrates a visualizations of sensed point cloud data in accordance with some aspects of the present technology.

FIGS. 5A and 5B illustrate a visualizations of sensed point cloud data in accordance with some aspects of the present technology. Specifically FIG. 5A shows the output of an over-calibrated trajectory prediction model, and FIG. 5B shows the output of an under-calibrated trajectory prediction model. In order to measure the degree of overestimation (i.e. over-calibration) or underestimation (i.e. under-calibration) of the uncertainty values, we compute the actual distribution of the Mahalanobis distances between the actual location of the object and the prediction (which is a Distribution around the predicted location with a standard deviation equal to the predicted uncertainty) over multiple objects. In the case where the model overestimates the size of the uncertainty values, the distributions look skinnier compared to the calibrated Rayleigh distribution as illustrated in FIG. 6.

Figure 6:
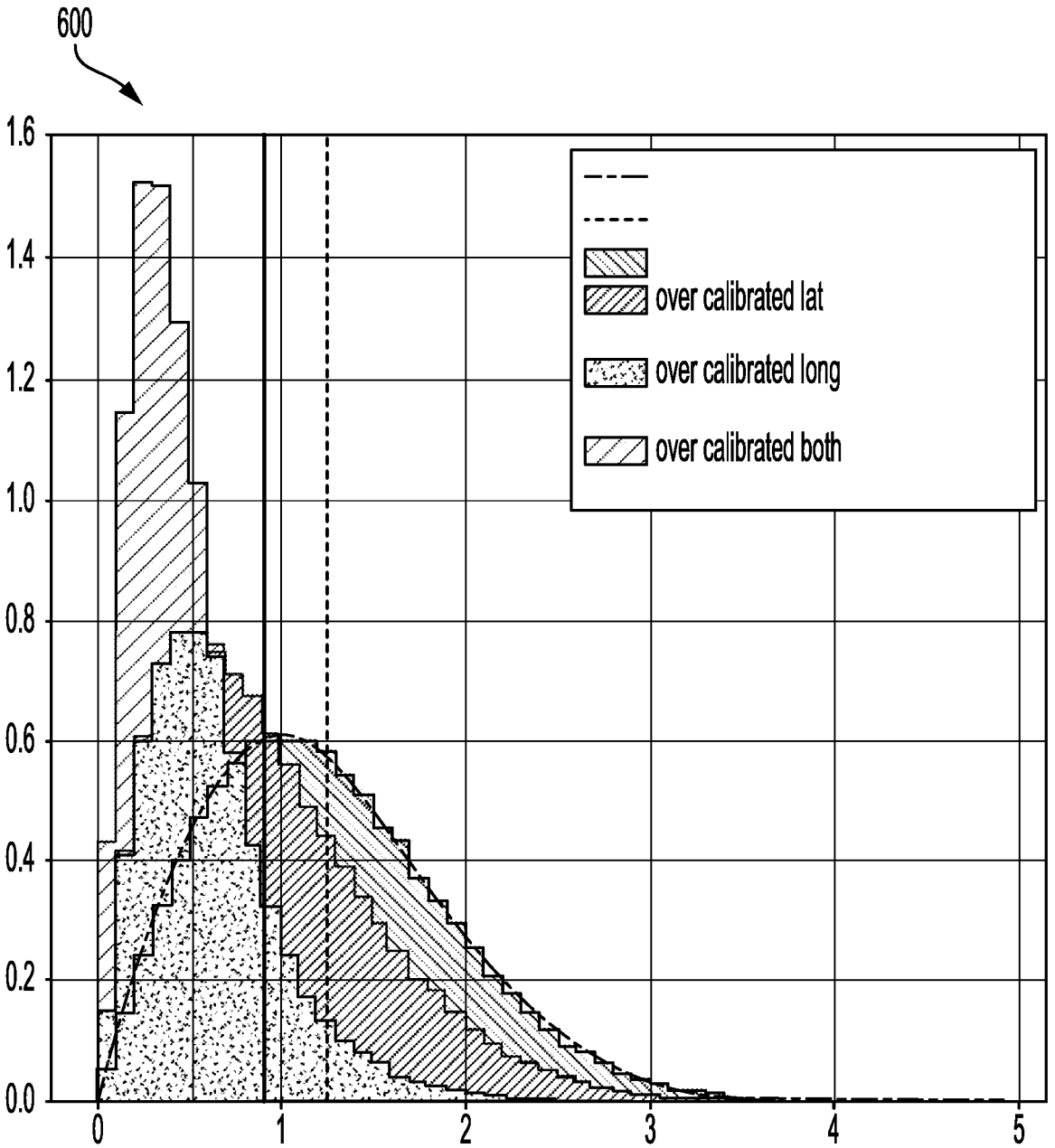
FIG. 6 illustrates a graph showing an example trajectory prediction model output of uncertainty values where the prediction model overestimates the uncertainty values in accordance with some aspects of the present technology.

FIG. 6 illustrates a graph 600 showing an example trajectory prediction model output of uncertainty values where the prediction model overestimates the uncertainty values. Specifically, graph 600 illustrates the Rayleigh distribution overlaid on the various uncertainty value outputs, such as the calibrated case, the over calibrated latitude case, the over calibrated longitude case, and the case when both latitude and longitude are over calibrated. As shown, when the trajectory prediction model overestimates the size of the uncertainty values, the distributions look skinnier compared to the calibrated Rayleigh distribution. The over calibrated latitude case, the over calibrated longitude case, and the case when both latitude and longitude are over calibrated shown in FIG. 6 are examples of distribution of Mahalanobis distances for trajectory prediction models which overestimate uncertainty bubbles. The distribution of Mahalanobis distances shown in FIG. 6 appear taller and narrower compared to the calibrated distribution. Likewise, in the case where the trajectory prediction model underestimates the size of the uncertainty values, the distributions appear wider compared to the calibrated Rayleigh distribution as illustrated in FIG. 7.

10

Figure 7:
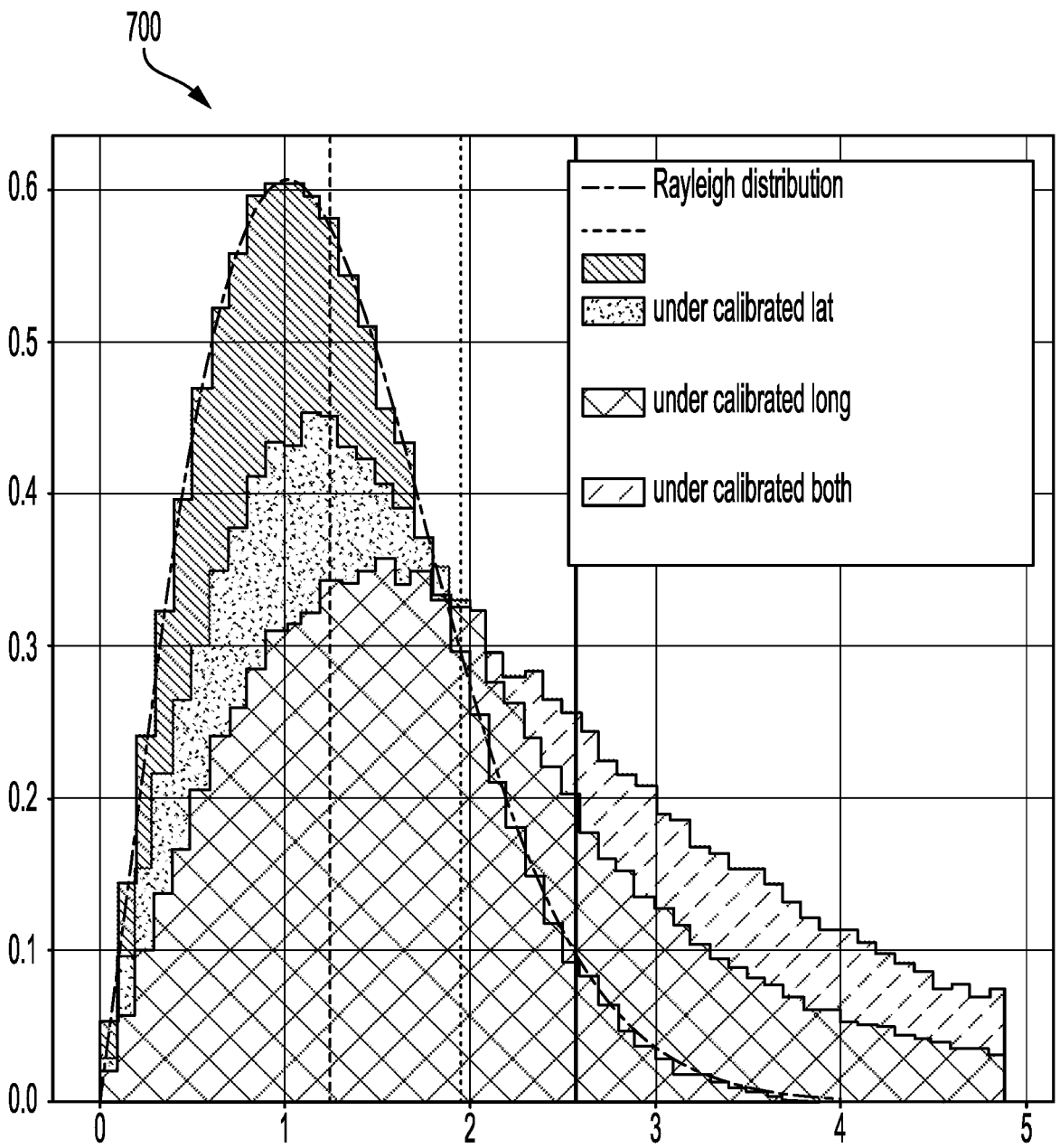
FIG. 7 illustrates a graph showing an example trajectory prediction model output of uncertainty values where the prediction model underestimates the uncertainty values in accordance with some aspects of the present technology.

FIG. 7 illustrates a graph 700 showing an example trajectory prediction model output of uncertainty values where the prediction model underestimates the uncertainty values. Specifically, graph 700 illustrates the Rayleigh distribution overlaid on the various uncertainty value outputs, such as the calibrated case, the under calibrated latitude case, the under calibrated longitude case, and the case when both latitude and longitude are under calibrated. As shown in graph 700, the distribution of Mahalanobis distances appear shorter and wider compared to the calibrated distribution (shown in blue).

Since the Rayleigh distribution is characterized by a single parameter (i.e. the scale), the means of the above distributions are compared to get a degree of uncertainty calibration (i.e. over/under estimation). The mean of a calibrated (scale=1) Rayleigh distribution ($\pi/2$) is divided by the mean of the distribution of Mahalanobis distances.

$$\frac{\sqrt{\frac{\pi}{2}}}{\text{distribution mean}}$$

If this quantity is >1, the trajectory prediction model overestimates the uncertainty values, and if this quantity is <1, the trajectory prediction model underestimates the uncertainty values. This quantity provides the degree of over/under estimation.

Figure 8:
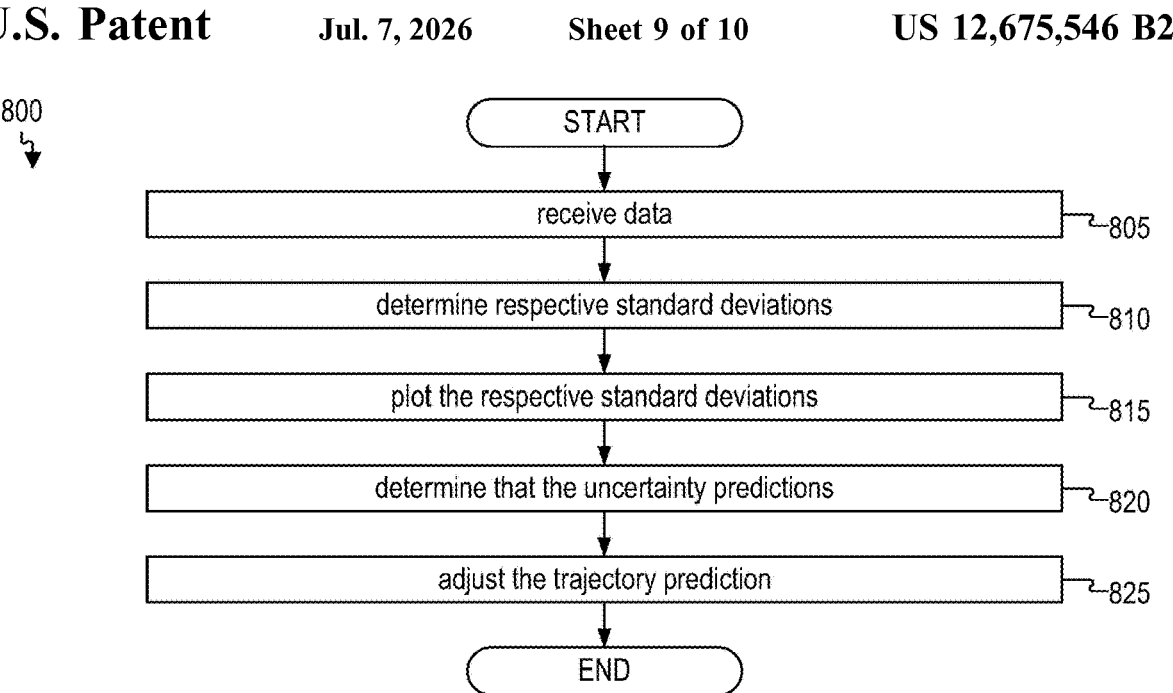
FIG. 8 is a flowchart of a method for measuring the quality of an uncertainty prediction provided by a trajectory prediction in accordance with some aspects of the present technology.

FIG. 8 illustrates an example method 800 for measuring the quality of an uncertainty prediction provided by a trajectory prediction algorithm. Although the example method 800 depicts a particular sequence of operations, the sequence may be altered without departing from the scope of the present disclosure. For example, some of the operations depicted may be performed in parallel or in a different sequence that does not materially affect the function of the method 800. In other examples, different components of an example device or system that implements the method 800 may perform functions at substantially the same time or in a specific sequence.

According to some embodiments, the method includes receiving data received from vehicles having a plurality of sensors and executing the trajectory prediction algorithm. The data includes predicted trajectories of objects received from the trajectory prediction algorithm (that is part of prediction stack 116), and observed paths for the objects received from the plurality of sensors (104, 106, 108, . . . ). The data can initially be stored in AV operational database 124 and transferred to data management platform 152.

The predicted trajectories indicate predicted locations of the objects at a plurality of time intervals, as well as uncertainty predictions reflecting an uncertainty about the location of the objects at each of the predicted time intervals at block 805. For example, the AI/ML platform 154 illustrated in FIG. 1 may receive data from data management platform 152 that was received from vehicles (AVs 102) having a plurality of sensors and execute the trajectory prediction algorithm (as part of the prediction stack 116).

According to some embodiments, the method includes determining respective standard deviations of the observed paths of the objects relative to the respective uncertainty predictions at block 810. For example, the AI/ML platform 154 illustrated in FIG. 1 may determine respective standard deviations of the observed paths of the objects relative to the respective uncertainty predictions.

In some embodiments, the observed paths are confirmed and labeled by ground truth labeling service. While the received data includes sensor data for a period of time following the time in which the path prediction was provided by the trajectory prediction algorithm, and this sensor data includes data that was generated from perceiving the motions of objects after the prediction, it is also useful to have a human labeler or software labeler, identify and label the observed path of objects for which the path prediction was provided. The ground truth labeling service can label the observed paths of perceived objects.

In some embodiments, the uncertainty predictions are a Gaussian distribution extended over an area, where the distribution reflects a probability that the object will deviate from the center of the prediction and take a path elsewhere in the area covered by the Gaussian distribution.

In some embodiments, the standard deviations are represented by Mahalanobis distances. Mahalanobis distances are a measure of a point to a curve. In the present instance, the point can be an observed location of an object and the curve can be the Gaussian distribution of the uncertainty prediction. According to some embodiments, the method includes plotting the respective standard deviations against an ideal distribution of path distributions relative to the predicted locations of the objects at the plurality of time intervals at block 815. For example, the AI/ML platform 154 illustrated in FIG. 1 may plot the respective standard deviations against an ideal distribution of path distributions relative to the predicted locations of the objects at the plurality of time intervals. In some embodiments, the ideal distribution of path distributions is a Rayleigh distribution. FIG. 6 and FIG. 7, addressed above, are examples of plots of respective standard deviations against an ideal distribution of path distributions.

In some embodiments, the ideal distribution of path distributions is divided into directional distributions (e.g., right-lateral, left-lateral, forward-longitudinal, or rear-longitudinal directions). Each directional distribution can be represented as a half distribution (e.g. a half-Gaussian or half-normal) that evaluates the uncertainty prediction in one direction, whereby the quality of uncertainty prediction is evaluated relative to the respective directions. The ideal distribution of path distributions in each direction can also be a Rayleigh distribution (or half Rayleigh distribution).

Evaluating deviations from the predicted path in a particular direction might reveal that the trajectory prediction algorithm is not well calibrated in a particular direction. For example, the uncertainty distributions provided by the algorithm may often incorrectly characterize a forward-longitudinal certainty, while correctly characterizing distributions in other directions. In other words, the observed path of the object might reflect that the path prediction algorithm does a good job of predicting the uncertainty of a path deviation to the right and left, but performs less well in determining how far along a path the object might travel over a period of time such that the path deviation in a forward direction is not as well calibrated.

According to some embodiments, the method includes determining that the uncertainty predictions provided by the trajectory prediction algorithm are underfitted or overfitted at block 820. For example, the AI/ML platform 154 illustrated in FIG. 1 may make such a determination.

According to some embodiments, the method includes using the AI/ML platform 154 illustrated in FIG. 1 to adjust the trajectory prediction algorithm to provide uncertainty predictions that better correlate to the ideal distribution of path distributions at block 825.

For example adjusting the trajectory prediction at block 825, may include determining that the uncertainty predictions provided by the trajectory prediction algorithm are underfitted or overfitted when the trajectory prediction algorithm is presented with a class of scenarios. When such scenarios are identified, AI/ML platform 154 illustrated in FIG. 1 can be used to train the trajectory prediction algorithm by providing additional training data pertaining to the class of scenarios. For example, it might be determined that the trajectory prediction algorithm predicts an area of uncertainty for a large object such as a bus that is too large in scenarios when the AV is beside the large object. In such examples, AI/ML platform 154 can provide more examples to the training set where the AV is next to a large object.

For example adjusting the trajectory prediction at block 825, may include using the AI/ML platform 154 illustrated in FIG. 1 to further train the trajectory prediction algorithm by adjusting loss values used to give feedback to a machine learning algorithm that becomes the trained prediction algorithm deployed in the prediction stack 116.

In a second example of the adjusting the trajectory prediction at block 825, the method comprises receiving the uncertainty prediction from the trajectory prediction algorithm. For example, the AI/ML platform 154 illustrated in FIG. 10 may receive the uncertainty prediction from the trajectory prediction algorithm.

In another example of adjusting the trajectory prediction at block 825, the prediction stack illustrated in FIG. 1 may compensate for the propensity of the trajectory prediction algorithm to underfit or overfit the uncertainty predictions by adjusting the received uncertainty prediction by adjusting the uncertain predictions received for the trajectory prediction algorithm during live use.

Figure 9:
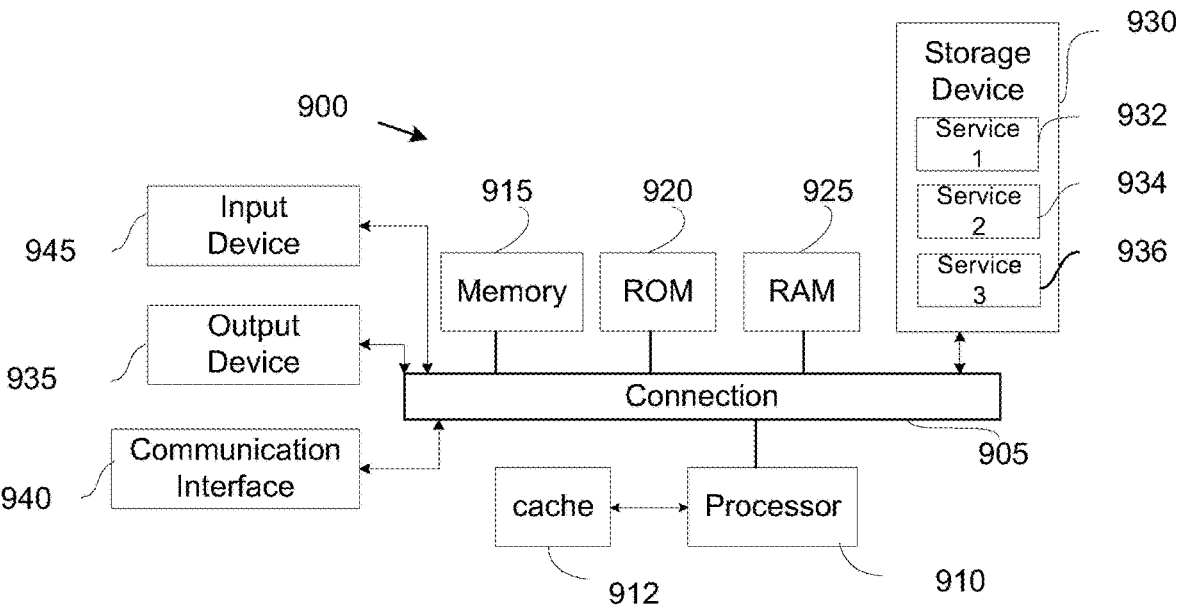
FIG. 9 shows an example of a system for implementing certain aspects of the present technology.

FIG. 9 shows an example of computing system 900, which can be for example any computing device making up AI/ML platform 154, or any component thereof in which the components of the system are in communication with each other using connection 905. Connection 905 can be a physical connection via a bus, or a direct connection into processor 910, such as in a chipset architecture. Connection 905 can also be a virtual connection, networked connection, or logical connection.

In some embodiments, computing system 900 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 900 includes at least one processing unit (CPU or processor) 910 and connection 905 that couples various system components including system memory 915, such as read-only memory (ROM) 920 and random access memory (RAM) 925 to processor 910. Computing system 900 can include a cache of high-speed memory 912 connected directly with, in close proximity to, or integrated as part of processor 910.

Processor 910 can include any general purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms known to those of skill in the art. In some instances, multimodal systems can enable a user to provide multiple types of input/output to communicate with computing system 900. Computing system 900 can include communications interface 940, which can generally govern and manage the user input and system output. There is no restriction on operating on any particular hardware arrangement, and therefore the basic features here may easily be substituted for improved hardware or firmware arrangements as they are developed.

Storage device 930 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 930 can include software services, servers, services, etc., that when the code that defines such software is executed by the processor 910, it causes the system to perform a function. In some embodiments, a hardware service that performs a particular function can include the software component stored in a computer-readable medium in connection with the necessary hardware components, such as processor 910, connection 905, output device 935, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Aspect 1. A method for measuring quality of an uncertainty prediction provided by a trajectory prediction algorithm, the method comprising: receiving data received from vehicles having a plurality of sensors and executing the trajectory prediction algorithm, the data including predicted trajectories of objects received from the trajectory prediction algorithm, and observed paths for the objects received from the plurality of sensors, the predicted trajectories indicating predicted locations of the objects at plurality of time intervals, uncertainty predictions reflecting an uncertainty about the location of the objects at each of the predicted time intervals; determining respective standard deviations of the observed paths of the objects relative to the respective uncertainty predictions; plotting the respective standard deviations against an ideal distribution of path distributions relative to the predicted locations of the objects at the plurality of time intervals; determining that the uncertainty predictions provided by the trajectory prediction algorithm are underfitted or overfitted; and adjusting the trajectory prediction algorithm to provide uncertainty predictions that better correlate to the ideal distribution of path distributions.

Aspect 2. The method of Aspect 1, wherein the uncertainty predictions are a Gaussian distribution.

Aspect 3. The method of any of Aspects 1 to 2, wherein the observed paths are confirmed and labeled by ground truth labeling service.

Aspect 4. The method of any of Aspects 1 to 3, wherein the standard deviations are represented by Mahalanobis distances.

Aspect 5. The method of any of Aspects 1 to 4, wherein the ideal distribution of path distributions is a Rayleigh distribution.

Aspect 6. The method of any of Aspects 1 to 5, wherein the ideal distribution of path distributions is divided into directional distributions, where each directional distribution is a half distribution (e.g. a half-Gaussian or half-normal) that evaluates the uncertainty prediction in one of a right-lateral, left-lateral, forward-longitudinal, or rear-longitudinal directions, whereby the quality of uncertainty prediction is evaluated relative to the respective directions.

Aspect 7. The method of any of Aspects 1 to 6, wherein the adjusting the trajectory prediction algorithm to provide uncertainty predictions that better correlate to the ideal distribution of path distributions comprises: determining that the uncertainty predictions provided by the trajectory prediction algorithm are underfitted or overfitted when the trajectory prediction algorithm is presented with a class of scenarios; training the trajectory prediction algorithm by providing additional training date pertaining to the class of scenarios.

Aspect 8. The method of any of Aspects 1 to 7, wherein the adjusting the trajectory prediction algorithm to provide uncertainty predictions that better correlate to the ideal distribution of path distributions comprises: training the trajectory prediction algorithm by adjusting loss values used to give feedback to a machine learning algorithm.

Aspect 9. The method of any of Aspects 1 to 8, wherein the adjusting the trajectory prediction algorithm to provide uncertainty predictions that better correlate to the ideal distribution of path distributions comprises: receiving the uncertainty prediction from the trajectory prediction algorithm; and compensating for the propensity of the trajectory prediction algorithm to underfit or overfit the uncertainty predictions by adjusting the received uncertainty prediction.

What is claimed is:

1. A method comprising:

receiving data including predicted trajectories of objects received from a trajectory prediction algorithm and observed paths for the objects, the predicted trajectories indicating predicted locations of the objects at a plurality of time intervals;

determining uncertainty predictions defining a predicted probabilistic distribution of potential object locations at each of the time intervals;

determining respective Mahalanobis distances, the Mahalanobis distances quantifying deviations of the observed paths of the objects from centers of the respective predicted probabilistic distributions relative to a spread defined by the uncertainty predictions;

plotting an actual distribution formed from the determined Mahalanobis distances against an ideal Rayleigh distribution, the ideal Rayleigh distribution representing an expected distribution of the Mahalanobis distances for calibrated uncertainty predictions;

determining, by comparing a characteristic of the actual distribution of Mahalanobis distances to a corresponding characteristic of the ideal Rayleigh distribution, that a calibration quality of the uncertainty predictions provided by the trajectory prediction algorithm indicates that the uncertainty predictions are underfitted or overfitted;

based on determining that the uncertainty predictions are underfitted or overfitted, adjusting a navigation path of an autonomous vehicle; and controlling the autonomous vehicle along the adjusted navigation path.

2. The method of claim 1, further comprising:

adjusting the trajectory prediction algorithm to provide uncertainty predictions that better correlate to the ideal Rayleigh distribution.

3. The method of claim 2, wherein adjusting the trajectory prediction algorithm to provide uncertainty predictions that better correlate to the ideal Rayleigh distribution comprises:

training the trajectory prediction algorithm by providing additional training data pertaining to a class of scenarios.

4. The method of claim 2, wherein adjusting the trajectory prediction algorithm to provide uncertainty predictions that better correlate to the ideal Rayleigh distribution comprises:

training the trajectory prediction algorithm by adjusting loss values used to give feedback to a machine learning algorithm.

5. The method of claim 1, wherein the comparison between the actual distribution of Mahalanobis distances and the ideal Rayleigh distribution is performed independently for each of a plurality of directional components of the deviations.

6. The method of claim 5, wherein the plurality of directional components comprises at least one of a right-lateral component, a left-lateral component, a forward-longitudinal component, or rear-longitudinal component.

7. An AI/ML platform for measuring quality of an uncertainty prediction provided by a trajectory prediction algorithm, comprising:

a storage configured to store instructions;

a processor configured to execute the instructions and cause the processor to:

receive data including predicted trajectories of objects received from a trajectory prediction algorithm and observed paths for the objects, the predicted trajectories indicating predicted locations of the objects at a plurality of time intervals;

determine uncertainty predictions defining a predicted probabilistic distribution of potential object locations at each of the time intervals;

determine respective Mahalanobis distances, the Mahalanobis distances quantifying deviations of the observed paths of the objects from centers of the respective predicted probabilistic distributions relative to a spread defined by the uncertainty predictions;

plot an actual distribution formed from the determined Mahalanobis distances against an ideal Rayleigh distribution, the ideal Rayleigh distribution representing an expected distribution of the Mahalanobis distances for calibrated uncertainty predictions;

determine, by comparing a characteristic of the actual distribution of Mahalanobis distances to a corresponding characteristic of the ideal Rayleigh distribution, that a calibration quality of the uncertainty predictions provided by the trajectory prediction algorithm indicates that the uncertainty predictions are underfitted or overfitted;

based on determining that the uncertainty predictions are underfitted or overfitted, adjust a navigation path of an autonomous vehicle; and control the autonomous vehicle along the adjusted navigation path.

8. The AI/ML platform of claim 7, wherein the processor is configured to execute the instructions and cause the processor to:

adjust the trajectory prediction algorithm to provide uncertainty predictions that better correlate to the ideal Rayleigh distribution.

9. The AI/ML platform of claim 8, wherein the processor is configured to execute the instructions and cause the processor to:

train the trajectory prediction algorithm by providing additional training date-data pertaining to a class of scenarios.

10. The AI/ML platform of claim 8, wherein the processor is configured to execute the instructions and cause the processor to:

train the trajectory prediction algorithm by adjusting loss values used to give feedback to a machine learning algorithm.

11. The AI/ML platform of claim 7, wherein the comparison between the actual distribution of Mahalanobis distances and the ideal Rayleigh distribution is performed independently for each of a plurality of directional components of the deviations.

12. The AI/ML platform of claim 11, wherein the plurality of directional components comprises at least one of a right-lateral component, a left-lateral component, a forward-longitudinal component, or a rear-longitudinal component.

13. A non-transitory computer readable medium comprising instructions, the instructions, when executed by a computing system, cause the computing system to:

receive data including predicted trajectories of objects received from a trajectory prediction algorithm and observed paths for the objects, the predicted trajectories indicating predicted locations of the objects at a plurality of time intervals;

determine uncertainty predictions at each of the time intervals defining a predicted probabilistic distribution of potential object locations;

determine respective Mahalanobis distances, the Mahalanobis distances quantifying deviations of the observed paths of the objects from centers of the respective predicted probabilistic distributions relative to a spread defined by the uncertainty predictions;

plot an actual distribution formed from the determined Mahalanobis distances against an ideal Rayleigh distribution, the ideal Rayleigh distribution representing an expected distribution of the Mahalanobis distances for calibrated uncertainty predictions;

determine, by comparing a characteristic of the actual distribution of Mahalanobis distances to a corresponding characteristic of the ideal Rayleigh distribution, that a calibration quality of the uncertainty predictions provided by the trajectory prediction algorithm indicates that the uncertainty predictions are underfitted or overfitted;

based on determining that the uncertainty predictions are underfitted or overfitted, adjust a navigation path of an autonomous vehicle; and control the autonomous vehicle along the adjusted navigation path.

14. The computer readable medium of claim 13, wherein the computer readable medium further comprises instructions that, when executed by the computing system, cause the computing system to:

adjust the trajectory prediction algorithm to provide uncertainty predictions that better correlate to the ideal Rayleigh distribution.

15. The computer readable medium of claim 14, wherein the computer readable medium further comprises instructions that, when executed by the computing system, cause the computing system to:

train the trajectory prediction algorithm by providing additional training date-data pertaining to a class of scenarios.

16. The computer readable medium of claim 14, wherein the computer readable medium further comprises instructions that, when executed by the computing system, cause the computing system to:

train the trajectory prediction algorithm by adjusting loss values used to give feedback to a machine learning algorithm.

17. The computer readable medium of claim 13, wherein the comparison between the actual distribution of Mahalanobis distances and the ideal Rayleigh distribution is performed independently for each of a plurality of directional components of the deviations.

* * * * *